(12) United States Patent
Koman et al.

(10) Patent No.: US 10,457,376 B1
(45) Date of Patent: Oct. 29, 2019

(54) AIRCRAFT STRETCHER CONNECTOR

(71) Applicant: Mary Josephine Koman-Keogh

(72) Inventors: Michael Andrew Koman, Santa Clarita, CA (US); Marvin Keogh

(73) Assignee: AIRMEDIC, North Hollywood, CA (US)

(*) Notice: Subject to any disclaimer, the term of this patent is extended or adjusted under 35 U.S.C. 154(b) by 159 days.

(21) Appl. No.: 15/369,430

(22) Filed: Dec. 5, 2016

Related U.S. Application Data (63) Continuation-in-part of application No. 15/216,619, filed on Jul. 21, 2016, now abandoned, which is a continuation of application No. 15/091,518, filed on Apr. 5, 2016, now abandoned, which is a continuation of application No. 14/973,655, filed on Dec. 17, 2015, now abandoned, which is a continuation of application No. 14/562,277, filed on Dec. 5, 2014, now abandoned, which is a continuation of application No. 14/444,837, filed on Jul. 28, 2014, now abandoned, which is a continuation of application No. 14/246,984, filed on Apr. 7, 2014, now abandoned, which is a continuation of application No. 14/076,607, filed on Nov. 11, 2013, now abandoned, which is a continuation of application No. 13/889,171, filed on May 7, 2013, now abandoned.

(60) Provisional application No. 61/644,124, filed on May 8, 2012.

(51) Int. Cl.
*B64D 11/00* (2006.01)
*B64C 1/20* (2006.01)
*B64D 11/06* (2006.01)

(52) U.S. Cl.
CPC ............ *B64C 1/20* (2013.01); *B64D 11/00* (2013.01); *B64D 11/0696* (2013.01)

(58) Field of Classification Search
CPC ....... B64C 1/20; B64D 11/00; B64D 11/0696; F16B 43/02; F16B 5/025; Y10T 403/75; H02G 7/05; E04B 9/006
USPC ......... 403/408.1; 411/508; 244/118.5, 118.6, 244/137.2, 131
See application file for complete search history.

(56) References Cited

U.S. PATENT DOCUMENTS

| | | | | |
|---|---|---|---|---|
| 3,219,086 A | * | 11/1965 | Zahodiakin | F16B 37/044 411/112 |
| 4,348,140 A | * | 9/1982 | Bergholz | F16B 5/0208 403/408.1 |
| 4,762,451 A | * | 8/1988 | Collins | B60R 11/00 411/177 |

(Continued)

*Primary Examiner* — Amber R Anderson
*Assistant Examiner* — Nahid Amiri
(74) *Attorney, Agent, or Firm* — Colin P. Abrahams (57) ABSTRACT

A block and bolt connector comprises a block having an aperture with a lower opening and an upper opening which is smaller than the lower opening. The aperture extends through the block from the lower opening to the upper opening, and has a first portion and a second portion. A bolt has a head portion which passes through the lower opening but not the upper opening, and a shaft which may pass through the lower opening and the upper opening. The head portion of the bolt is received within aperture of the block and the shaft extends at least partially outside of the block beyond the upper opening. The first and second portions of the aperture are configured so as to permit selected movement of the bolt within the aperture relative to the block.

14 Claims, 11 Drawing Sheets

(56) References Cited

U.S. PATENT DOCUMENTS

| | | | | |
|---|---|---|---|---|
| 5,066,180 A * | 11/1991 | Lang | F16B 37/044 | 411/103 |
| 5,310,299 A * | 5/1994 | Bernstein | B25B 5/08 | 269/229 |
| 5,542,777 A * | 8/1996 | Johnson | B61D 17/043 | 403/384 |
| 5,634,734 A * | 6/1997 | Schron, Jr. | B66C 1/66 | 294/215 |
| 6,010,274 A * | 1/2000 | Abouzahr | F16B 5/02 | 403/408.1 |
| 6,260,197 B1 * | 7/2001 | Hoogewind | A61F 9/061 | 2/8.3 |
| 6,261,042 B1 * | 7/2001 | Pratt | F16B 5/10 | 411/551 |
| 6,367,224 B1 * | 4/2002 | Leek | E04B 1/2604 | 403/187 |
| 6,443,514 B1 * | 9/2002 | Fuller | B66C 1/66 | 294/215 |
| 6,813,865 B2 * | 11/2004 | Peterson | B60R 13/0206 | 296/39.1 |
| 7,371,027 B2 * | 5/2008 | Mochizuki | F16B 5/025 | 24/279 |
| 7,784,150 B2 * | 8/2010 | Anderson | B61D 3/18 | 105/355 |
| 8,353,649 B2 * | 1/2013 | Csik | F16B 37/045 | 411/108 |
| 8,579,570 B2 * | 11/2013 | Fellows | F16B 37/0842 | 411/112 |
| 8,747,015 B1 * | 6/2014 | Polewarczyk | F16B 33/002 | 403/384 |
| 2002/0190518 A1 * | 12/2002 | Kang | B21D 22/04 | 280/801.1 |
| 2006/0251496 A1 * | 11/2006 | Wood | F16B 5/02 | 411/507 |
| 2007/0063122 A1 * | 3/2007 | Bowd | B64C 1/20 | 248/429 |
| 2007/0220735 A1 * | 9/2007 | Arbona | B62D 29/048 | 29/525.01 |

* cited by examiner

AIRCRAFT STRETCHER CONNECTOR

CROSS-REFERENCE TO RELATED APPLICATIONS

This application is a continuation in part of U.S. patent application Ser. No. 15/216,619 filed Jul. 21, 2016, which is a continuation of patent application Ser. No. 15/091,518 filed Apr. 5, 2016, which is a continuation of patent application Ser. No. 14/973,655 filed Dec. 17, 2015, which is a continuation of U.S. patent application Ser. No. 14/562,277 filed Dec. 5, 2014, which is continuation of U.S. patent application Ser. No. 14/444,837 filed Jul. 28, 2014, which is a continuation of U.S. patent application Ser. No. 14/246,984 filed Apr. 7, 2014, which is a continuation of U.S. patent application Ser. No. 14/076,607 filed Nov. 11, 2013, which is a continuation application of U.S. patent application Ser. No. 13/889,171 filed May 7, 2013, which claims the benefit of U.S. Provisional Patent Application No. 61/644,124 filed May 8, 2012, the contents of all of which are incorporated herein by reference in their entirety.

FIELD AND BACKGROUND OF THE INVENTION

This invention relates to devices and components for connecting a stretcher to an aircraft. More particularly, the invention is for a connecting system whereby a stretcher may be releasably connected to an aircraft by attachment to the tracks in the aircraft which may normally be used for seating attachment. In one specific aspect, the invention relates to a connector device which is located intermediate a platform or substrate and a support, wherein the connected device selectively allows some movement between the substrate and the support. In a preferred embodiment, the substrate comprises a track in the floor of an aircraft, and the support comprises the leg or post of a stretcher for use in an aircraft.

The invention thus relates to devices and components for connecting an object to a substrate, particularly where the connection requires some give and take movement of the object relative to the substrate. The devices and components of the invention therefore connect the object to the substrate in a manner which is not completely rigid or inflexible, but allow some selected minimal movement of the object relative to the substrate, particularly in response to external forces.

Most passenger commercial aircraft have a cabin area, primarily for the arrangement of seating in rows and lines. The floor of the aircraft cabin will comprise a series of tracks onto which the passenger seats may be firmly attached.

It will sometimes be necessary to utilize space in the aircraft for medical patients who are being transported by the aircraft, or may become ill on the aircraft and require treatment. In these instances, a stretcher may be installed or fitted within the aircraft cabin. The stretcher may include a frame, legs, and specially adapted and constructed connectors whereby the stretcher may be firmly but releasably attached to the tracks on the floor of the cabin in the aircraft. A firm attachment is, of course, required to keep the stretcher steady and stable, especially when the aircraft may encounter turbulence, or during takeoff and landing operations.

Even though a firm and stable connection is required, it is also important that the stretcher be attached in a manner whereby some flexibility or restricted movements are possible. While some connections between stretcher and floor cabin track may prevent any such movement, it has been found that a small degree of non-rigidity or flexibility is useful and even advantageous in certain circumstances. In other words, some relative movement between the stretcher and the floor of the cabin is a desirable constructional feature, even while the stretcher remains firmly connected to the floor of the cabin and will not separate therefrom.

SUMMARY OF THE INVENTION

According to one aspect of the invention, there is provided a block and bolt connector comprising: a block having an aperture with a lower opening and an upper opening which is smaller than the lower opening, the aperture extending through the block from the lower opening to the upper opening, the aperture having a first portion and a second portion; a bolt having a head portion which may pass through the lower opening but not the upper opening and a shaft which may pass through the lower opening and the upper opening, the head portion of the bolt being received within aperture of the block and the shaft extending at least partially outside of the block beyond the upper opening thereof, the first and second portions of the aperture being configured so as to permit selected movement of the bolt within the aperture relative to the block.

Preferably, the first portion of the aperture is generally cylindrical in shape and the second portion of the aperture is at least partially arcuate in shape. In one embodiment, the second portion of the aperture comprises a radial shape. Further, the first portion of the aperture may be cylindrical in shape and have a height which is at least that of the head portion of the bolt.

In one embodiment, the upper opening is circular and has a diameter which is greater than the diameter of the shaft. Further, the block may comprise fastening means for attaching the block to a substrate. The fastening means may comprise a pair of lateral bores each for accommodating a connector bolt, the connector bolt attaching to a threaded aperture in the substrate.

Preferably, the block is mounted on a base block, which may attach to a substrate. The substrate may comprise a track in the floor of an aircraft, and the bolt connects to an aircraft stretcher.

In one embodiment, the base block has an upper surface and a lower surface, and comprises a recessed step on the upper surface thereof, the block being accommodated within the recessed step.

A tightening washer may threadedly engage with the shaft of the bolt, the washer being movable on the shaft between a first position wherein the bolt will substantially not move relative to the block, and a selected second position wherein limited movement of the bolt relative to the block is permitted. Further, there may be a second washer mounted on the shaft for securing the first washer.

In one embodiment, the base block comprises securing bolts, and expanders mounted on the securing bolts, for securing the base block to the substrate.

According to another aspect of the invention, there is provided a method of securing an object to a substrate, the method comprising: providing a block and forming an aperture therein with a lower opening and an upper opening which is smaller than the lower opening, the aperture extending through the block from the lower opening to the upper opening, the aperture having a first portion and a second portion; and mounting a bolt having a head portion and a shaft in the aperture such that the head portion may pass through the lower opening but not the upper opening and the shaft portion may pass through the lower opening and the upper opening, the head portion of the bolt being received within aperture of the block and the shaft extending at least partially outside of the block beyond the upper opening thereof, the first and second portions of the aperture being configured so as to permit selected movement of the bolt within the aperture relative to the block.

The method may comprise the step of forming the first portion of the aperture in a generally cylindrical shape and forming the second portion of the aperture in an arcuate shape. The arcuate shape may comprise a radius. In one embodiment, the object is a medical stretcher and the substrate is the floor in the cabin of an aircraft. Preferably, the medical stretcher is selectively movable within defined tolerances relative to the floor of the cabin of the aircraft.

The present invention, in one aspect thereof, therefore provides for a connector system and components whereby the stretcher and stretcher frame may be attached to the track in the floor of the cabin in a manner which allows some minimal movement, which may not only be beneficial, but may also be a requirement of some aviation authorities.

In another aspect of the invention, there is provided a connector system and components whereby an object may be attached to a substrate in a manner which allows some minimal relative movement to occur between the object and the substrate. In some cases, such minimal movement may be beneficial, permitting a small degree of resilience between the object and the substrate. Such benefits may be seen when opposing or different directional forces occur between the object and the substrate, and the connector system absorbs or reduces such opposing or different forces for protective purposes and to reduce breakage or potential shock between the object and the substrate. It should be appreciated that the preferred embodiment does not allow movement of the object on the substrate itself, but rather offers a resilience whereby the object is able to move without compromising the connection between such object and the substrate.

In another aspect of this invention, there is provided a connector and connection system for attaching a stretcher to tracks in the floor of a cabin, the tracks being of specific type and configuration. In one embodiment, these tracks may be of the type which may be found in the Boeing 787 aircraft, including any variations or different models thereof.

The invention may further provide for a connection system which is relevant to Boeing 787 specific stretcher development and installation, although different configurations of the invention may be used on other aircraft, and specifically adapted to the specific hardware of such other aircraft to facilitate proper connection. Included are specifics on stretcher location, "not to exceed" envelopes, structural interface detail, and loading allowables.

Are they connect to system of the invention is directed mainly at its use in an aircraft, it may be used in other contexts as well, including other modes of transport. Such other modes of transport may include trains, ships, helicopters, ambulances and the like, to name a few possibilities without limiting the application of the invention.

One embodiment of the invention articulates engineering detail relevant to stretcher design and integration within the 787 aircraft interior. Specifically, these details may relate to structural interface detail, electrical interface detail, "not-to-exceed" zones, and load limits are all supplied for reference by the stretcher manufacturer.

In one aspect of the invention, the stretcher and its associated connection system of the invention will satisfy or address some or all of the following parameters:

(1) Locate stretcher near medical outlets, forward of door 2 and 4 on the left hand side;
(2) Avoid loading through the passenger seat belt;
(3) Take into consideration any patient attendant seating; and
(4) Design of primary structural elements to facilitate inspection for wear, deterioration, or any other condition that would degrade safety.

As mentioned, one specific embodiment of this invention is relevant to the location of the stretcher within the Boeing aircraft 787, or other type of aircraft. Boeing requirements may identify stretcher provisions which may be provided for eight and nine abreast economy class seat configurations, a selectable feature for economy class configurations only.

Medical outlets may be provided and will be typically located forward of doors two and four on the left hand side of the aircraft, and positioned in the first panel forward of the stow bin end cap.

Identification and definition of all relevant stay out zones for stretcher development and installation need to be considered in locating a stretcher on an aircraft. Specifically seat break-over, aisle clearance, interior surface clearance, and door clearance information must be factored in.

In a preferred and specific form of the invention, the stretcher will have a clearance height of about 38 inches above the top of the seat track at a minimum to accommodate seat back break over heights. The stretcher will not deform or deflect by an amount greater than 1.9 inches under static or dynamic loading conditions to ensure load sharing does not occur.

Furthermore, in a specific embodiment of the invention, the stretcher legs will interface with the seat track defined and described herein, and adhere to the stay out zone requirements which may be detailed.

Removal of the seat track cover connector and associated assembly can be effected for mechanical integration of the stretcher to the seat track; however, electrical connectivity should be maintained throughout the plug and play system to ensure IFE operation. Engineering support for, and procurement of, components which mate to the seat track connector and maintain connectivity should be established.

This invention, in one form, therefore adds a removable medical stretcher carrier that attaches to the aircraft seat tracks and possibly the seats as well. The stretcher preferably installs over a row of seats, fastening to the seat tracks and replacing the seat belts. The stretcher carrier attaches to two lateral beams, which in turn attach to the aircraft seat tracks. The forward, aft, and side G loads are reacted into the adjacent seat belt fittings. This preferably results in loads at the seat belt anchors lower or equal to that of a seated passenger. The stretcher carrier legs primarily react vertical loads, though they are designed to assist in lateral load reaction as well.

Since the stretcher carriers may attach to the seat belt anchors, and to lateral adapter tracks which in turn attach to the aircraft the seat tracks, they are similar to a seat installation, which is a certified product carried by the airframe.

Aircraft seat tracks for the majority of Part 25 airframes have been of a common design since the early 1950's, usually referred to as a "Brownline" track. This has allowed the installation and connection system to readily fit to almost any aircraft. For the Boeing 787, the seat tracks have been changed to a row of holes in a titanium extrusion below the floorboards, as generally illustrated in the drawings, to be described below. Seats and other components must attach with blind bolts to these holes.

Boeing has required that items attaching to the tracks be able to remain attached to the tracks in a track misalignment condition that may occur in an emergency landing.

In addition, the in-flight entertainment (IFE) system in almost all passenger configurations is run via "Plug and Play" cables extending from seat to seat, in the slot between the floorboards. By installing the stretcher carrier, the IFE system cables must be removed to allow access to the tracks, but the system must be restored for flight.

The stretcher carrier installation as adapted to the Boeing 787 is essentially:

(1) the same STC approved carrier which will be used, attaching to:

(2) Two lateral adapter tracks specific to the 787, to match the track spacing; these attach to:

(3) A new seat track fitting, consisting of a swivel fitting mounted to a block, which connects of:

(4) The aircraft seat track, using Boeing-approved track attachment blind bolts;

(5) To provide continuity of the IFE system, four provided "jumper cables" reconnect the data and power system at the seats.

As will be seen with reference to the drawings, described more fully below, one aspect of the invention comprises a metal block component having lateral apertures by means of which it can be secured to the track in the floor of the cabin in an aircraft. Further, there is a larger central aperture which receives a bolt. The larger aperture has a first portion which is somewhat or substantially cylindrical, near the lower surface of the block, and a second portion which is somewhat or substantially tapering. The central aperture has an opening at the upper surface of the block.

The bolt includes a shaft and a head. The bolt is inserted in the central aperture, with the head and part of the shaft of the bolt occupying the first and second portions of the aperture. The shaft of the bolt extends through the opening at the upper surface of the block, while the head of the bolt is captured within the central aperture.

When the block is placed on a surface, with the bolt mounted in the central aperture, it will be possible for the bolt to have some up and down movement corresponding to the height of the substantially cylindrical portion of the central aperture. Additionally, it will be possible for the bolt to be oriented slightly with respect to the vertical axis.

This block and bolt arrangement allows for some flexibility or small movement of the stretcher. Ultimately, the stretcher is fastened, either directly or indirectly, to the bolt, which is in turn secured to the track or other appropriate platform. Therefore, since the bolt is selectively permitted some movement within the block, there will be some corresponding movement allowed by the mounted stretcher. Note that the connector device of the invention may be adjusted so that the bolt is not permitted any movement when attached within the block, or the amount of movement may be varied depending upon how the bolt is secured with nuts or threaded washers within the recess and block. A description of these options is provided below with reference to the drawings.

It will thus be appreciated that the extent of possible movement can be adjusted and fine tuned depending upon the configuration and dimensions of the central aperture, and particularly the relative sizes of the substantially cylindrical component or portion, and the substantially spherical portion.

It should also be appreciated that the present invention may be used in contexts other than the mounting of a stretcher in an aircraft cabin. The configuration and structure of the block and bolt combination can be used in any situation where a mounting of some flexibility or permissible movement is required or advantageous. Therefore, it should be clearly understood that the present invention, and, in this regard, the block and bolt portion thereof, may have many potential applications and uses other than in an aircraft context.

DETAILED DESCRIPTION OF THE INVENTION

Reference is now made to the drawings, which show various embodiments of a connector system in accordance with the invention, and the positioning thereof in relation to an aircraft and medical stretcher, wherein the connector serves as an intermediary connection mechanism and form with attachment between the floor of the aircraft and the medical stretcher. The medical stretcher would be installed on an as needed basis, and removed for storage either on or off the aircraft when not needed.

Figure 1:
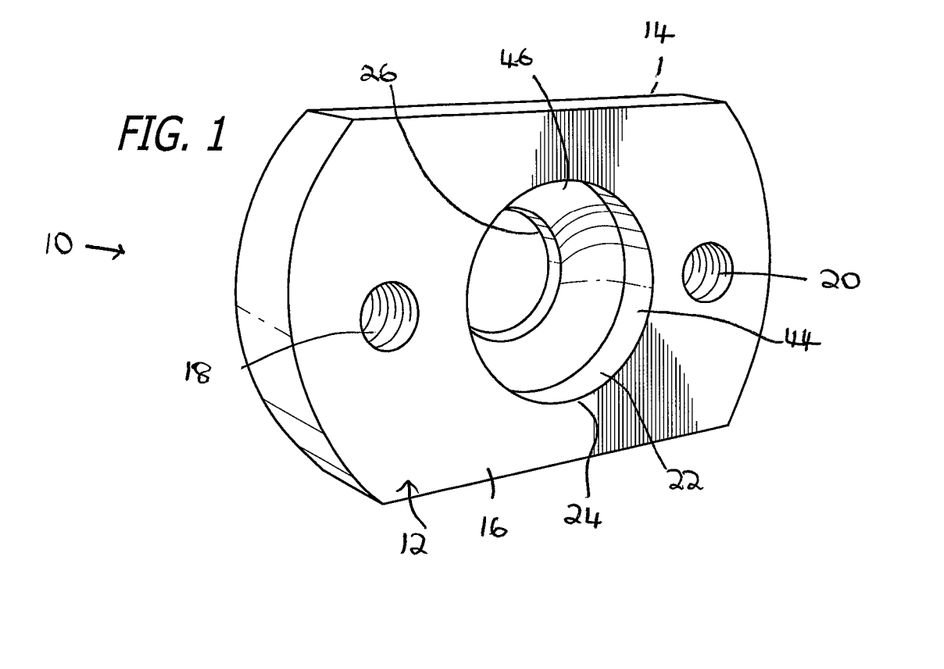
FIG. 1 is a perspective view of a block of a connector in accordance with one aspect of the invention.

FIGS. 1 to 4 of the drawings show various perspectives of a block and bolt in accordance with the present invention. FIG. 1 of the drawings illustrates a connector system 10 comprising a block 12 having an upper surface 14 and a lower surface 16. The block 12 includes two lateral threaded apertures 18 and 20 by means of which the block 12 may be secured to a substrate, such as, for example, the tracking in a floor of an aircraft. The block 12 may be secured to the substrate either directly or through an intermediary base block, as will be described in a further embodiment below. In the center of the block 12, there is a contoured recess or channel 22 extending through the entirety of the block 12. The contoured channel 22 has a larger opening 24 into the lower surface 16 of the block 12, and a smaller opening 26 into the upper surface 14 of the block 12.

The apertures 18 and 20 are utilized for firmly securing directly or in directly the block 12 to the substrate, such as a track in the floor of an aircraft, by means of securing bolts. The securing bolts may threadedly engage each of the apertures 18 and 20, and the apertures 18 and 20 are spaced from each other so that the distance between them corresponds to registering threaded apertures in the track on the floor of an aircraft or the base block upon which they may be mounted. The securing bolts are firmly tightened so as to secure the block 12. As mentioned, in a further embodiment of the invention, described below, the block 12 itself may be attached to a base, and the base in turn attached to the substrate, such as the track in the floor of an aircraft.

Figure 2:
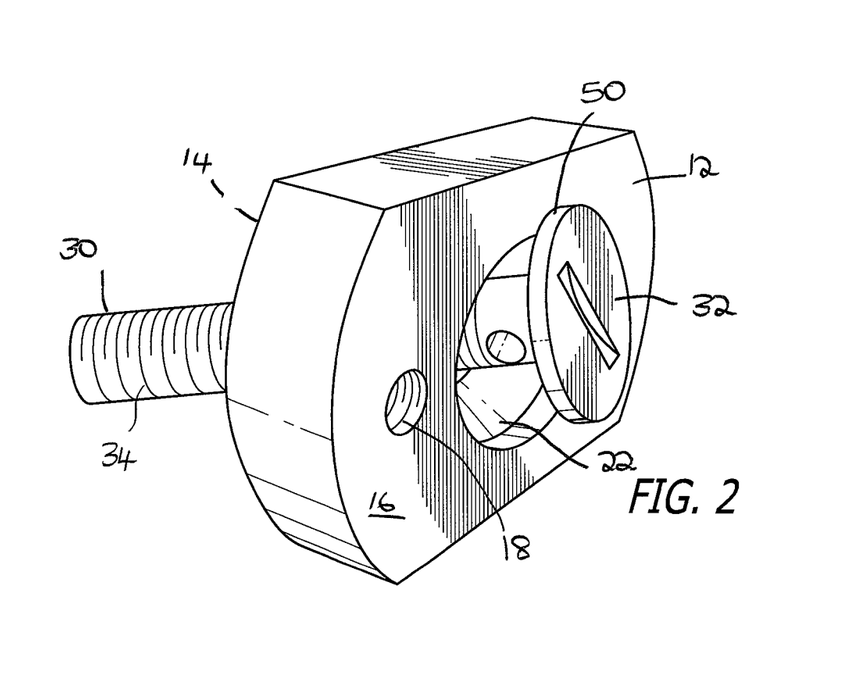
FIG. 2 is a perspective view of the block shown in FIG. 1 of the drawings, with a bolt partially inserted.
Figure 3:
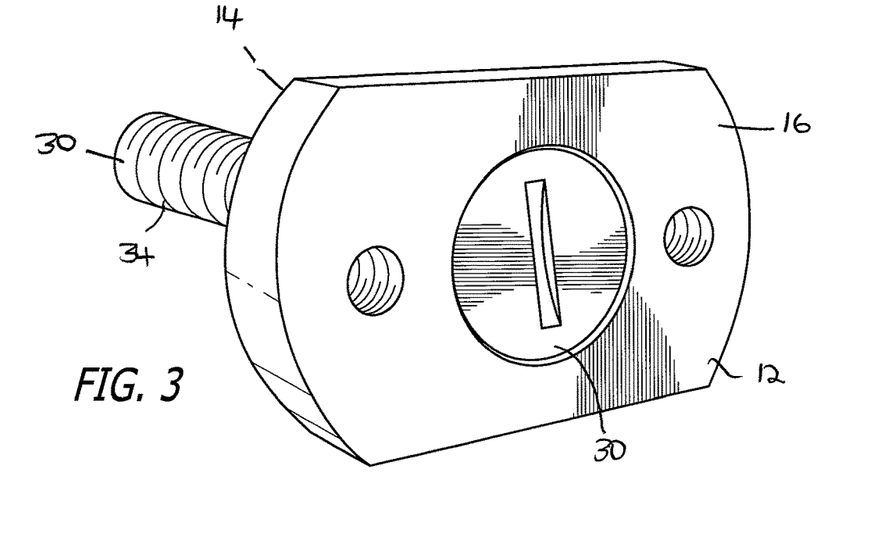
FIG. 3 is a rear perspective view of a block and bolt in accordance with the present invention wherein the bolt is inserted in the block.
Figure 4:
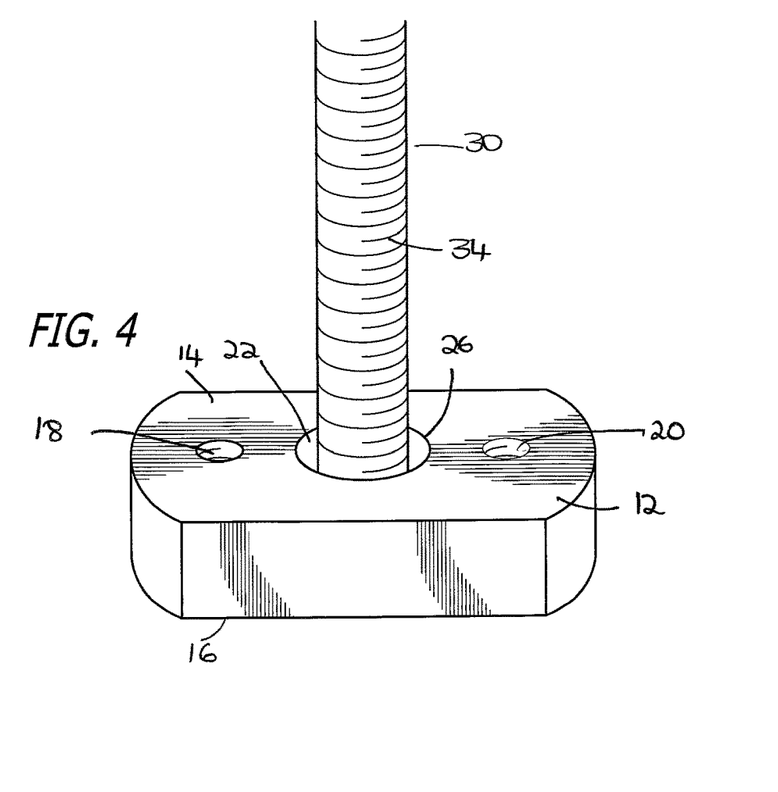
FIG. 4 is a top perspective view of the block and bolt shown in FIG. 3 of the drawings.

A bolt 30 is received within the recessed or contoured channel 22. The bolt 30 comprises a bolt head 32 and a threaded shaft 34 the threaded shaft 34 has a diameter which allows it to pass through the larger opening 24 as well as the smaller opening 26. In fact, the smaller opening 26 has a diameter which is slightly larger than that of the shaft 34. The bolt head 32 has a diameter which is a size that allows it to pass through the larger opening 24, but wherein its diameter exceeds that of the small opening 26. The head 32 will in use therefore normally be accommodated within the contoured recess 22, and secured therein. Further, the bolt 30 will cooperate with the block 12 such that it may be inserted through the contoured recess 22. FIG. 2 of the drawings shows the bolt 30 partially inserted through the contoured recess or channel 22 of the block 12. FIG. 3 of the drawings shows the bolt 30 inserted within the block 12 such that the shaft 34 extends outwardly and away from the upper surface 14 of the block 12, but wherein the bolt 30 is incapable of exiting the block 12 through the small opening 26. FIG. 4 of the drawings shows a top perspective view wherein the shaft 34 of the bolt 30 can be seen extending through the contoured aperture 22, beyond the upper surface 14 of the block 12.

It will be seen, in a preferred embodiment, that the diameter of the smaller opening 26 is larger than the diameter of the shaft 34 so that the shaft will have some leeway within the opening 26, and the tolerances will allow movement of the bolt 30 relative to the block 12, as will be described below. The smaller opening 26 will not, however, allow passage therethrough of the bolt head 32 which has a diameter exceeding that of the smaller opening 26.

It will be seen from FIG. 1 of the drawings, as well as subsequent illustrations herein, that the contoured channel or recess 22 has a specific configuration which will allow the bolt 30 to move relative to the block 12 in a selected manner. In other words, the position of the shaft 34 need not be restricted to one in which its vertical axis is fixed relative to the block 12, but may be capable of some swivelling or rotational movement.

The contoured channel 22 comprises a lower tubular or generally cylindrical portion 44 and an upper arcuate portion 46. The lower cylindrical portion 44 will generally have the same diameter as the larger opening 24, and extend from the lower surface 16 up through the block for a distance at least equal to the thickness 50 of the bolt head 32, and in certain embodiments may exceed the thickness 50 of the bolt head 32 by a small or predetermined amount. The upper arcuate portion 46 extends from the lower cylindrical portion 44 to the smaller opening 26. This upper arcuate portion 46 thus has a diameter at one edge thereof equivalent to that of the lower cylindrical portion 44, and a diameter at the opposing end thereof equivalent to that of the smaller opening 26.

The upper arcuate portion 46 may curve or arc in a line representing a radius. However, the invention is not limited to radial curvature of the arcuate portion 46, and other selected shapes may be used.

The construction of the contoured recess 22, including the lower cylindrical portion 44 and the upper arcuate portion 46 allows the bolt 30 to move within the contoured recess 22 in a limited manner. When the lower surface 16 is mounted on a substrate or platform, the bolt head 32 will be trapped within the contoured recess 22. However, the configuration of the contoured recess 22, and the fact that the smaller opening 26 may have a slightly larger diameter than the shaft 34 of the bolt 30, permits the orientation of the bolt 32 to vary relative to the block 12.

In use, the amount of such movement of the bolt 30 relative to the block 12 can be controlled or modulated. It will be seen that the threaded shaft 34 can receive one or more threaded nuts or washers (illustrated in later figures). When the threaded washer is tightened onto the shaft 34 so that it tightly abuts against the upper surface 14 of the block 12, the bolt 30 will be more securely fixed and little or no relative movement between the bolt 30 and the block 12 will be permitted. In other words, a tightened washer will cause the bolt head 32 to be firmly captured within the contoured recess 22 so that it is incapable of movement therein. However, selectively and incrementally loosening the nut or washer will allow limited movement between the bolt 30 and the block 12 so that the axis of the shaft 34 can move, and the bolt 30 can swivel or move in a somewhat rotatory manner within the contoured channel 22, and relative to the block 12. It will be appreciated that the extent to which the nut or washer may be loosened will modulate the amount of such permitted movement. The looser the washer on the shaft 34 of the bolt 30, the more permitted movement there will be.

Figure 5:
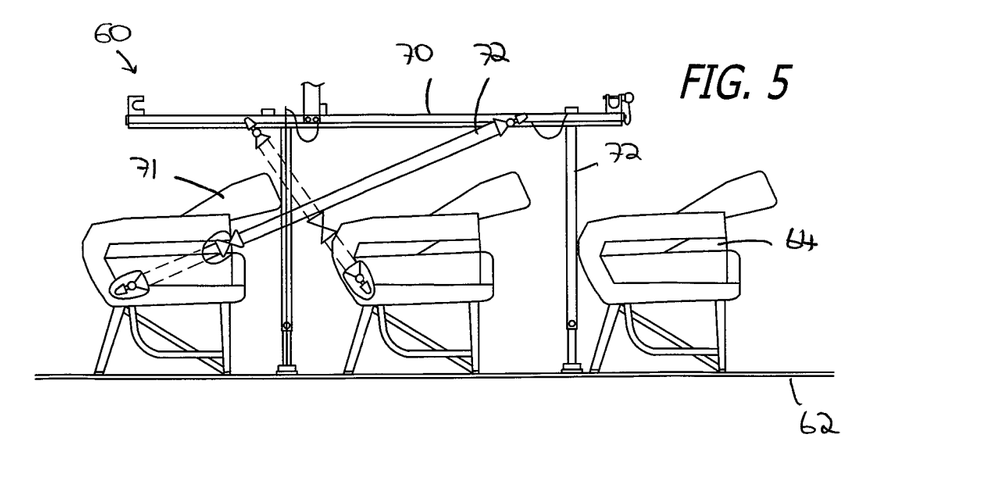
FIG. 5 is a schematic representation showing the positioning of an aircraft stretcher mounted between and over a seats in the cabin of an aircraft.
Figure 6:
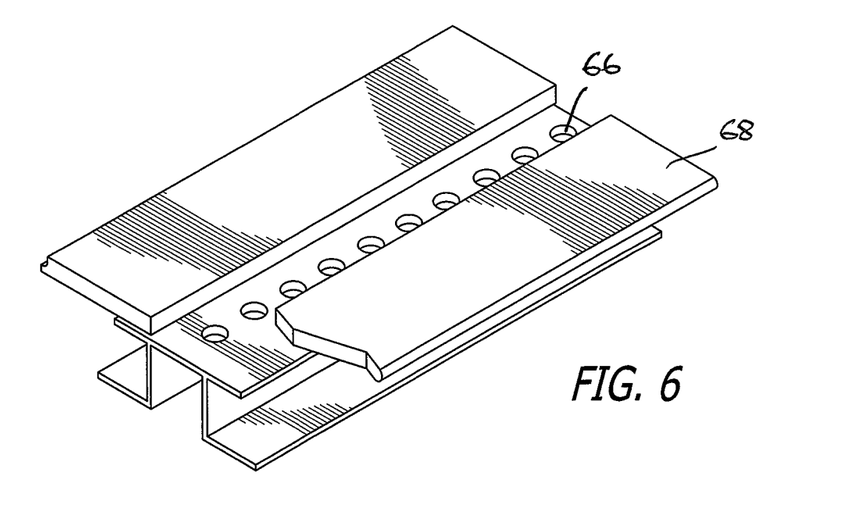
FIG. 6 is a detailed view of a track in the floor of an aircraft to which the connector of the present invention may be secured.

FIG. 5 of the drawings illustrates schematically the placement of an aircraft stretcher 60 within the cabin of an aircraft. The cabin has a floor 62 with appropriate tracking which would normally be used for the securement of seats 64 to the floor 62. FIG. 6 of the drawings shows one particular type of track which may be found in an aircraft, such as the Boeing 787, including a series of equi-spaced apertures 66 formed in the track 68, whereby seating or of the equipment may be firmly secured within the cabin.

Figures 7, 8:
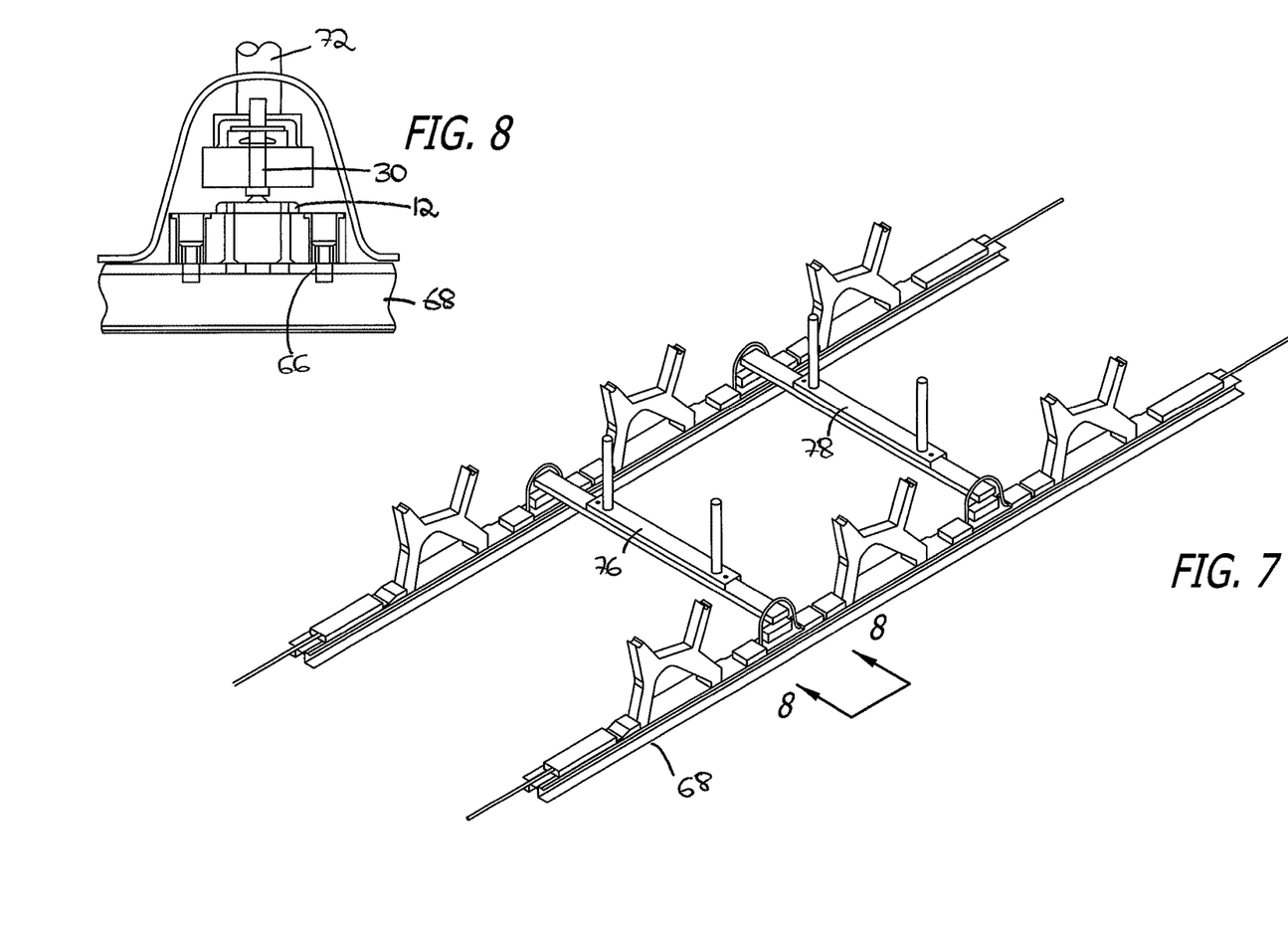
FIG. 7 is a schematic representation showing a pair of tracks in an aircraft, connectors on the tracks, and cross brackets inserted thereon.
FIG. 8 is a detailed side view showing the mechanism by means of which the connector is attached to the tracks, and part of a stretcher attached to the connector.

The aircraft stretcher 60 comprises a generally horizontal laying surface 70 mounted on four legs 72 extending between the laying surface 70 and the floor 62 of the aircraft, and located between rows of seats 64. In this embodiment, the seat backs 71 have been folded downward to accommodate the laying surface 70. Seat belts 72 may be used for the purpose of securing and stabilizing the aircraft stretcher 60 when in its operative position, in any one of several different configurations, one of which is illustrated in FIG. 5 of the drawings. The four legs 72 forming part of the aircraft stretcher 60, which may be folded or collapsed for storage purposes, attach to the front and rear support bases 76 and 78, as illustrated in FIG. 7 of the drawings. These front and rear support bases 76 and 78 attach to a connector system 10 in accordance with the present invention, which is intermediate the track 68 and the support bases 76 and 78. FIG. 8 of the drawings provides an end view of the arrangement, showing a track 68 with apertures 66, the apertures 66 receiving a connector base, which in turn supports the block 12 and the bolt 30. The bolt 30 connects to one of the legs 72 of the aircraft stretcher 60, and when suitably adjusted as described herein, either ensures a firm generally non-yielding connection between the aircraft stretcher 60 and the support bases 76 and 78, or by appropriate modulation a somewhat flexible connection wherein small movements are tolerated by virtue of the fact that the bolt 30 is able to move relative to the block 12 based on its position within the contoured recess 22.

Figure 9:
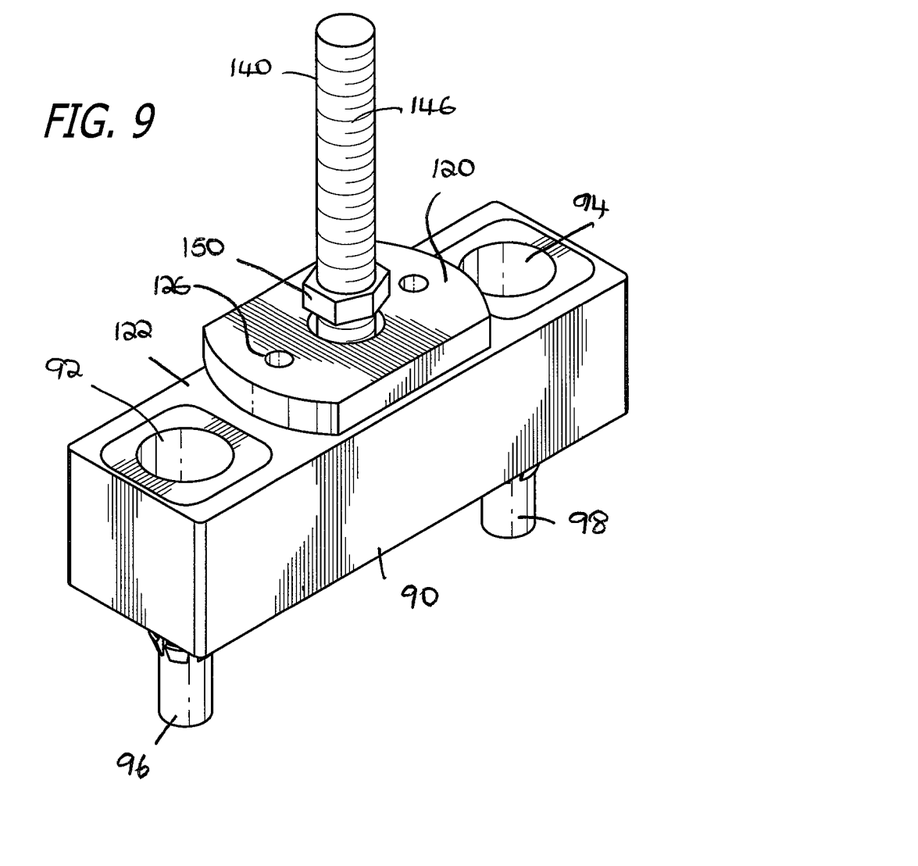
FIG. 9 is a perspective view of a connector in accordance with a further aspect of the invention.
Figure 10:
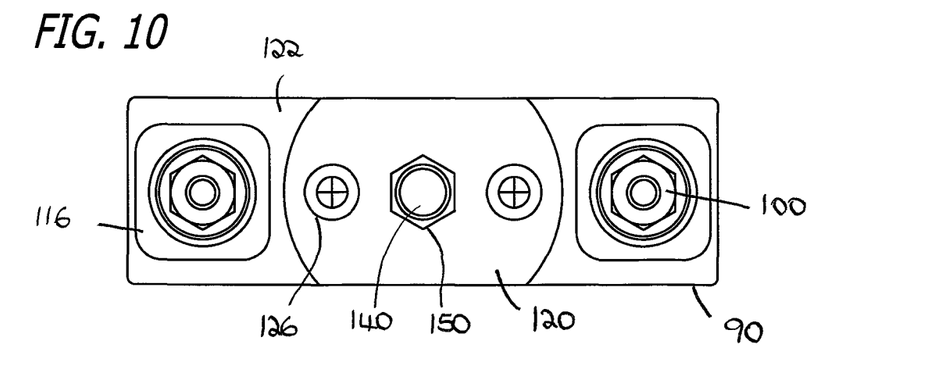
FIG. 10 is a top view of the connector shown in FIG. 9 of the drawings.
Figure 11:
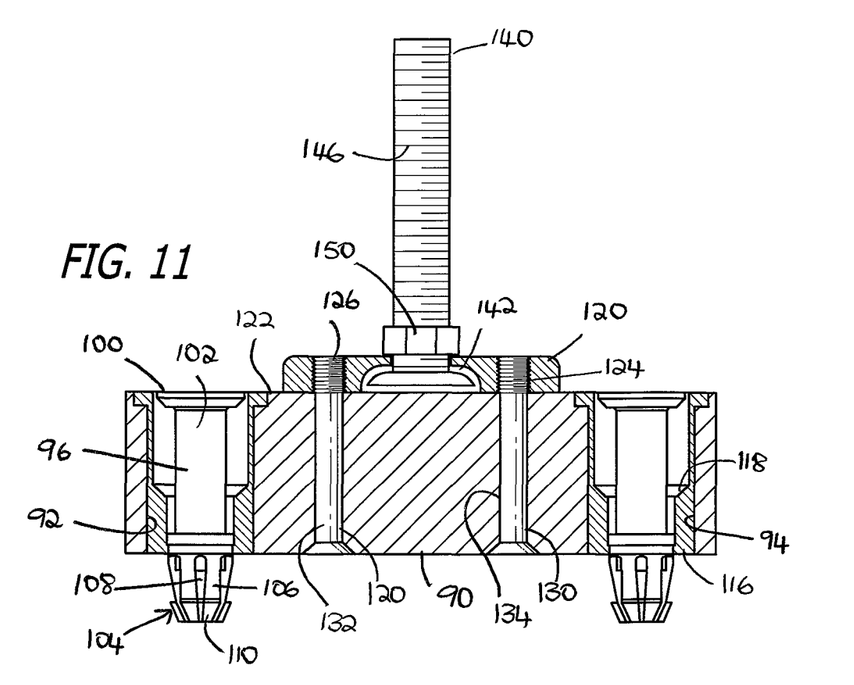
FIG. 11 is a cross-section through the connector shown in FIG. 9 of the drawings.

FIGS. 9, 10 and 11 show a further embodiment of a connection system in accordance with the invention. In these drawings, there is shown a base block 90 having two lateral apertures 92 and 94 by means of which a pair of connecting bolts 96 and 98 may be used to secure the base block 92 to the track located in the floor of an aircraft cabin, as has been previously described. The connecting bolts 96 and 98 comprise a head 100 and a threaded shaft 102. The threaded shaft 102 threadedly engages with an expander 104 comprised of arms 106 separated by spaces 108. The arms 106 have lower lips 110. As the connector bolt 96 threadedly engages the expander 104, the arms 106 of the expander 104 move oppositely and outwardly so that the lower lips 110 eventually engage the underside or other part of a shelf or other appropriate structure in the track. This ensures that the base block 90 is firmly secured to the track. It will be appreciated that other forms of connection between the base block and the track may be utilized, and the invention is not limited to any one embodiment. In fact, the mechanism of attachment may depend upon the nature of the substrate, which in the case of an aircraft floor may further depend upon the model of the aircraft, as well as its vintage and other factors.

Each aperture 92 and 94 has inserted therein a sleeve 116. The sleeve 116 is fixed within the apertures 92 and 94. The head 100 of the connecting bolt 96 moves within a portion of the sleeve 116, which has a shelf 118 setting the limits of downward movement of the connecting bolt 96.

A block 120 is mounted on the upper surface 122 of the base block 90. The block 120 has a pair of lateral threaded apertures 124 and 126, while the base block 90 includes a pair of corresponding bores 128 and 130. A pair of block connectors 132 and 134 extend through the bores 128 and 130 and threadedly engage with the apertures 124 and 126 respectively so that the block 120 is securely mounted on the upper surface 122 of the base block 90, and is incapable of movements thereon.

Prior to securement of the block 120 on the base block 90, a bolt 140 is placed in the contoured recess or channel 142 so that the threaded shaft 146 extends outwardly through an aperture of the contoured recess 142, while the head 148 of the bolt 140 remains secured in the contoured recess 142. A nut 150 (or washer) is threaded onto the threaded shaft 146. It will be seen that, as long as the nut 150 is not in a fully tightened position, the head 148 of the bolt 140 can move within the contoured recess 142. This allows the shaft 146 to swivel or rotate slightly, so that its axial orientation is varied.

The shape of the head 148 as well as the contoured channel or recess 142, which have been described above, facilitate such movement of the head 148 within the contoured recess 142. When the nut 150 is tight, the head 148 will be raised to abut against the upper part of the block 120 defining the contoured recess 142, and will be incapable of movement. As the nut is selectively loosened, some movement of the bolt 140 will be permitted to facilitate such swiveling or rotation.

Figure 12:
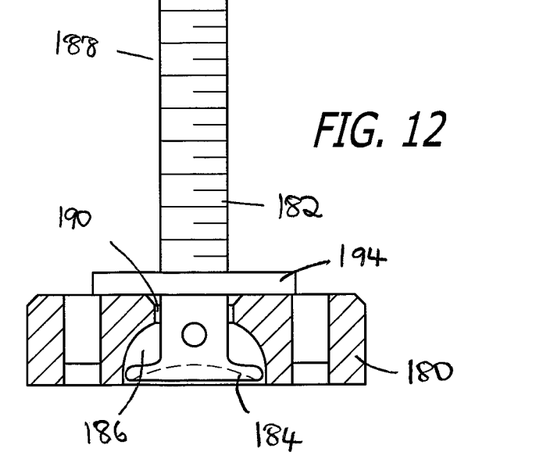
FIG. 12 is a detailed cross-section through a block and bolt of a connector wherein the bolt is in the generally vertical position.
Figure 13:
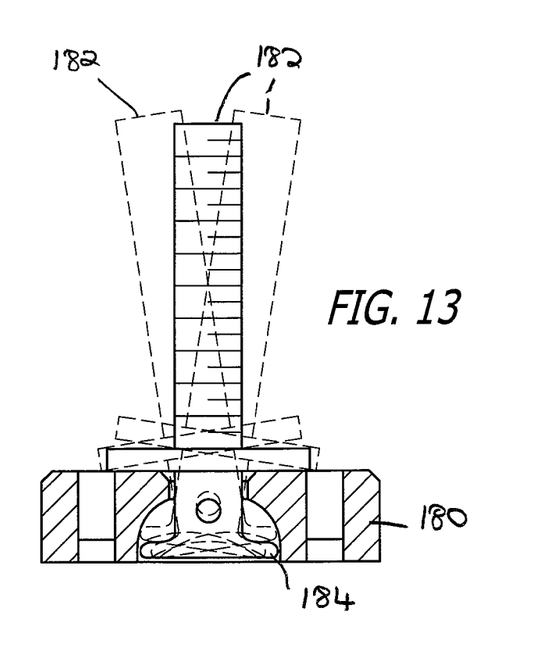
FIG. 13 is a detailed cross-section through a block and bolt of a connector showing the bolt and potentially three different orientations thereof within the block.

FIGS. 12 and 13 of the drawings show a detail of a block 180 and bolt 182, wherein the head 184 of the bolt 182 is in a contoured recess 186, and the shaft 188 of the bolt 182 extends outwardly through opening 190. The configuration of the contoured recess 186 is such that the bolt head 184 can move therein, in various positions, as illustrated in FIG. 13 of the drawings. A threaded washer 194 can be selectively tightened or loosened in order to modulate or very the amount of movement permitted of the bolt 182.

Figure 14:
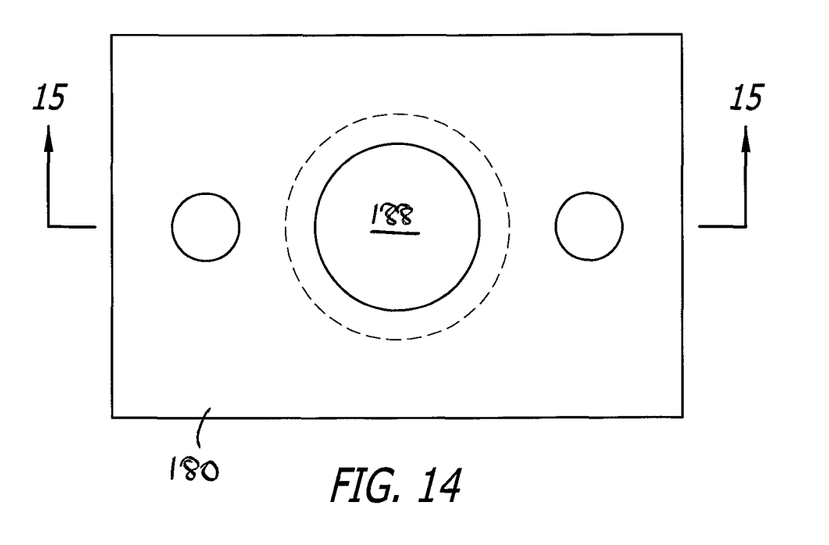
FIG. 14 is a top view of a block shown in FIG. 15 of the drawings.
Figure 15:
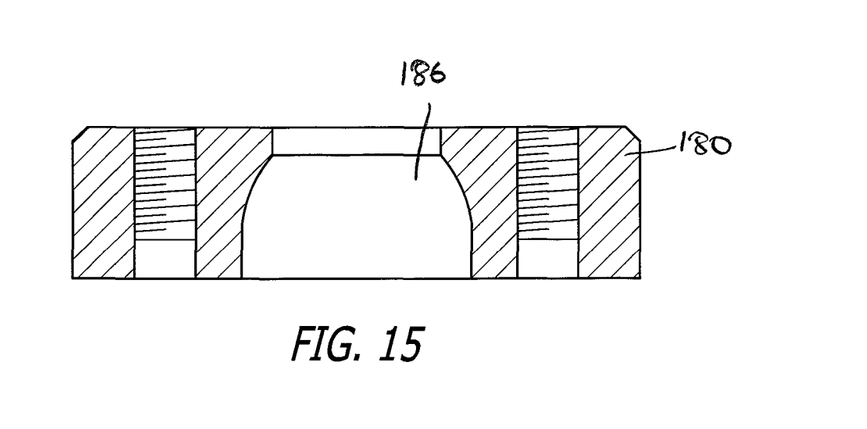
FIG. 15 is a cross-section through a block in accordance with one aspect of the invention.

FIGS. 14 and 15 of the drawings show a detail of the block 180, FIG. 14 being a top view, and FIG. 15 being a sectional view. FIG. 15 illustrates a slightly different and alternate configuration of the contoured channel or recess 186. This contoured recess 186 may take many different shapes, but the common feature or characteristic of all of such shapes would be the ability of the bolt head 184, and hence the bolt 182 itself, to be capable of swiveling or rotatory movement within the contoured recess 182.

Figure 16:
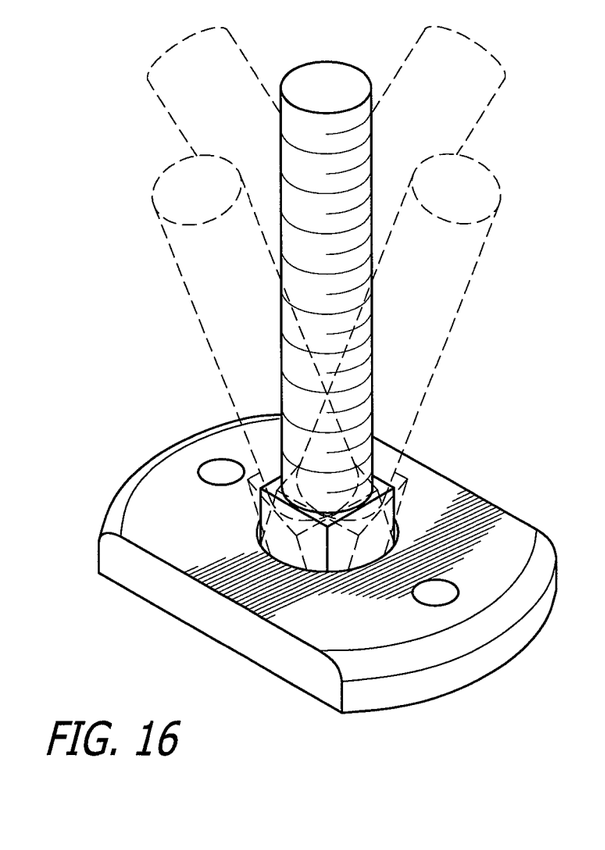
FIG. 16 is a perspective view of a block and bolt in accordance with a further aspect of the invention, indicating additionally in phantom lines just a few of the potential positions which the bolt may have relative to the block.

FIG. 16 of the drawings shows a further perspective view of a connecting system in accordance with the invention, wherein the shaft of the bolt is capable of assuming a number of different positions and orientations, while still being firmly secured within the block. This is an important feature of the invention, namely, a strong securement of the bolt to the substrate, but nevertheless providing the bolt with the ability to have some limited flexibility and movement, so that it will not present a rigid form of attachment, and that some flexibility will be permitted in response to forces, such as those which would normally be encountered in an aircraft going through takeoff, landing, and possible turbulence, all of which affect the motions of an aircraft stretcher which may be supported by the connecting system.

Figure 17:
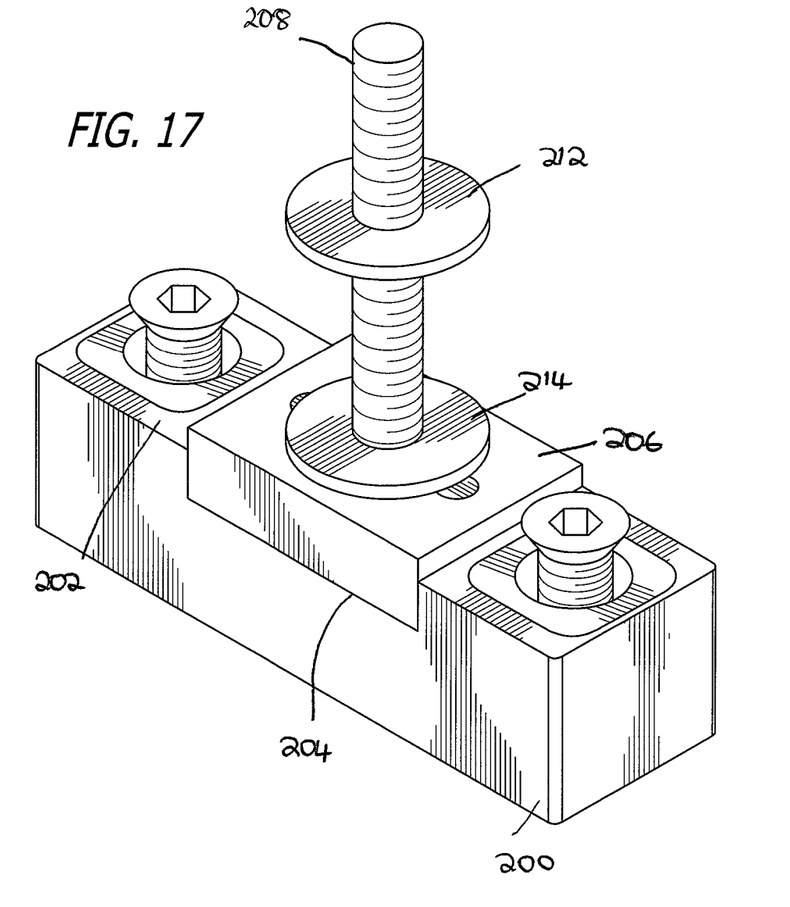
FIG. 17 is a perspective view of a connector in accordance with a further aspect of the invention.
Figure 18:
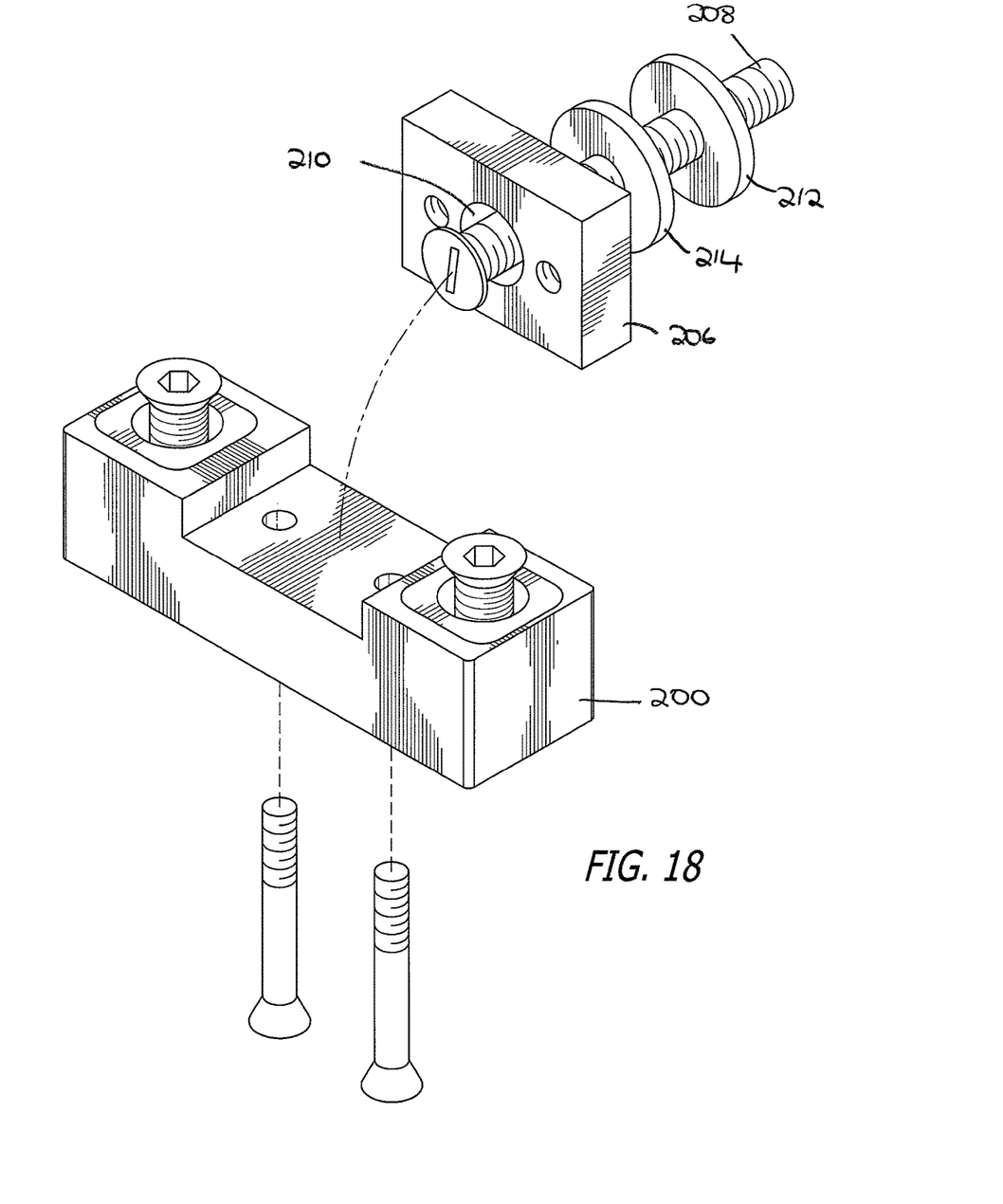
FIG. 18 is an exploded view of the connector shown in FIG. 17 of the drawings.

With reference to FIGS. 17 and 18, a further embodiment of the invention is illustrated. In this embodiment, a base block 200 is provided, somewhat similar to the situation in previous embodiments, but the upper surface 202 of the base block has a recessed step 204 for receiving the block 206. The head of the bolt 208, when connected and the system is in operation, will be formed in the contoured recess 210 which will be closed off at its lower end by the upper surface of the recessed step 204. The recessed step 204 provides additional strength to the connection between the block 206 and the base block 200.

It will be seen that the embodiments illustrated in FIGS. 17 and 18 comprise a pair of threaded washers 212 and 214. The lower washer 214, when fully tightened, prevents movement of the bolt 208 within the recessed aperture 210. The second upper threaded washer 212 may be screwed down the threaded shaft of the bolt 208 until it firmly engages with the lower threaded washer 212, providing a more secure attachment so that the lower threaded washer 212 will not inadvertently, or in response to vibrations or other movement, loosen. Such loosening will be essentially prevented by turning the upper threaded washer 212 until it engages with the lower washer 214, wherever the lower washer 214 may be located. As will be appreciated from the above description, the lower washer 214 may be loosened along the length of the shaft of the bolt 208, and the amount of such loosening will allow some flexibility of movement of the bolt 208 relative to the block 206, to avoid in selective increments the rigidity of the connection, as has been described with reference to previous embodiments.

The invention is not limited to the details of construction or the precise embodiments as illustrated herein. A significant number of variations and modifications may be made for achieving the same purpose, and these all fall within the scope of the invention.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

The invention claimed is:

1. A block and bolt connector comprising:
   a block having an aperture with a lower opening and an upper opening which is smaller than the lower opening, the aperture extending through the block from the lower opening to the upper opening, the aperture having a first portion and a second portion;
   a bolt having a head portion which may pass through the lower opening but not the upper opening and a shaft which may pass through the lower opening and the upper opening, the head portion of the bolt being received within aperture of the block and the shaft extending at least partially outside of the block beyond the upper opening thereof, the first and second portions of the aperture being configured so as to permit selected movement of the bolt within the aperture relative to the block; and
   wherein the connector connects a medical stretcher to floor tracks in an aircraft.

2. A block and bolt connector as claimed in claim 1 wherein the first portion of the aperture is generally cylindrical in shape and the second portion of the aperture is at least partially arcuate in shape.

3. A block and bolt connector as claimed in claim 2 wherein the second portion of the aperture comprises a radial shape.

4. A block and bolt connector as claimed in claim 2 wherein the first portion of the aperture is cylindrical in shape and has a height which is at least that of the head portion of the bolt.

5. A block and bolt connector as claimed in claim 1 wherein the upper opening is circular and has a diameter which is greater than the diameter of the shaft.

6. A block and bolt connector as claimed in claim 1 wherein the block comprises fastening means for attaching the block to a substrate.

7. A block and bolt connector as claimed in claim 6 wherein the fastening means comprises a pair of lateral bores each for accommodating a connector bolt, the connector bolt attaching to a threaded aperture in the substrate.

8. A block and bolt connector as claimed in claim 1 wherein the block is mounted on a base block.

9. A block and bolt connector as claimed in claim 8 wherein the base block has an upper surface and a lower surface, and comprises a recessed step on the upper surface thereof, the block being accommodated within the recessed step.

10. A block and bolt connector as claimed in claim 8 wherein the base block comprises securing bolts, and expanders mounted on the securing bolts, for securing the base block to the substrate.

11. A block and bolt connector as claimed in claim 1 further comprising a tightening washer threadedly engaging with the shaft of the bolt, the washer being movable on the shaft between a first position wherein the bolt will substantially not move relative to the block, and a selected second position wherein limited movement of the bolt relative to the block is permitted.

12. A block and bolt connector as claimed in claim 11 comprising multiple and selective second positions.

13. A block and bolt connector and claimed in claim 11 further comprising a second washer mounted on the shaft for securing the first washer.

14. A block and bolt connector as claimed in claim 1 wherein the aircraft is a Boeing 787.

\* \* \* \* \*